(12) United States Patent  
Reasor et al.

(10) Patent No.: US 7,620,679 B2  
(45) Date of Patent: *Nov. 17, 2009

(54) SYSTEM AND METHOD FOR GENERATING AGGREGATED DATA VIEWS IN A COMPUTER NETWORK

(75) Inventors: Sterling Reasor, Bellevue, WA (US); John Brezak, Woodinville, WA (US); Eric Flo, Sammamish, WA (US); Mohammed Samji, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 312 days.

This patent is subject to a terminal disclaimer.

(21) Appl. No.: 10/691,872

(22) Filed: Oct. 23, 2003

(65) Prior Publication Data

US 2005/0091337 A1    Apr. 28, 2005

(51) Int. Cl.  
*G06F 15/16* (2006.01)  
*G06F 17/30* (2006.01)

(52) U.S. Cl. .............. 709/200; 709/217; 709/218; 709/219; 707/1; 707/3

(58) Field of Classification Search ......... 709/201–203, 709/217–219, 200; 707/1, 3–5, 10  
See application file for complete search history.

(56) References Cited

U.S. PATENT DOCUMENTS

| | | | | |
|---|---|---|---|---|
| 5,163,147 A | * | 11/1992 | Orita ........................ | 707/9 |
| 5,715,443 A | * | 2/1998 | Yanagihara et al. ........... | 707/3 |
| 6,324,566 B1 | * | 11/2001 | Himmel et al. ............. | 709/203 |
| 6,389,477 B1 | * | 5/2002 | Simmon et al. ............. | 709/234 |
| 6,567,810 B1 | * | 5/2003 | Singhal ....................... | 707/3 |
| 6,594,670 B1 | * | 7/2003 | Genser ...................... | 707/102 |
| 6,745,180 B2 | * | 6/2004 | Yamanoue .................. | 707/3 |
| 7,031,954 B1 | * | 4/2006 | Kirsch ....................... | 707/3 |
| 7,130,841 B1 | * | 10/2006 | Goel et al. .................. | 707/3 |
| 7,216,115 B1 | * | 5/2007 | Walters et al. .............. | 707/3 |
| 2001/0013096 A1 | * | 8/2001 | Luckenbaugh et al. ...... | 713/154 |
| 2002/0059163 A1 | * | 5/2002 | Smith ......................... | 707/1 |
| 2002/0099685 A1 | * | 7/2002 | Takano et al. ............... | 707/1 |
| 2003/0041054 A1 | * | 2/2003 | Mao et al. ................... | 707/3 |
| 2003/0158947 A1 | * | 8/2003 | Bloch et al. ................ | 709/227 |
| 2004/0153440 A1 | * | 8/2004 | Halevy et al. ............... | 707/3 |
| 2005/0209951 A1 | * | 9/2005 | Aron et al. .................. | 705/37 |
| 2006/0080306 A1 | * | 4/2006 | Land et al. .................. | 707/3 |
| 2007/0174237 A1 | * | 7/2007 | Wilbrink et al. ............ | 707/3 |

* cited by examiner

*Primary Examiner*—Nathan J. Flynn  
*Assistant Examiner*—Joshua Joo  
(74) *Attorney, Agent, or Firm*—Shook, Hardy & Bacon LLP (57) ABSTRACT

A system and method for generating aggregated content views in a computing network are provided. A host computing device obtains a request for an aggregated view of content corresponding to a set of criteria. The host computing device queries itself and each computing device in a defined network for locally stored content matching the set of criteria. The query results are merged and displayed to a user at the host computing device as an aggregated list view.

6 Claims, 10 Drawing Sheets

SYSTEM AND METHOD FOR GENERATING AGGREGATED DATA VIEWS IN A COMPUTER NETWORK

FIELD OF THE INVENTION

In general, the present invention relates to computer software and computer communication networks, and in particular, to a system and method for aggregating and displaying the contents of storage locations across a computer network.

BACKGROUND OF THE INVENTION

Generally described, the advancement and availability of computing devices and communication networks connecting computing devices provides a variety of operating environments for computer users. In a managed computing network environment, common to business and other large-scale computing networks, the computing network includes a centralized network authority, such as a primary domain controller, that regulates user access by maintaining passwords and permissions. The centralized network authority can also manage access to locally stored data files to authorized users of the network.

In contrast to the managed computing networks, unmanaged computing networks, common to homes and other small-scale networks, do not typically incorporate a primary domain controller for regulating user access or centralized data file storage. Instead, many unmanaged computing networks require individual user management in terms of regulating user security authorization to use the various computing devices on the network. Further, most unmanaged networks require additional user participation and knowledge to store and recall content stored on the various computing devices on the network. One attempt to provide standardized user authentication has been proposed in commonly assigned, co-pending application Ser. No. 10/414,354, entitled SMALL-SCALE SECURED COMPUTER NETWORK GROUP WITHOUT CENTRALIZED MANAGEMENT, and filed on Apr. 15, 2003, in which a user's security identification is replicated to each computing device in an unmanaged network.

One attempt to provide for a more centralized storage of data in both managed and unmanaged networks corresponds to the creation of shared storage locations that can be found on one of the networked computing devices. The shared storage location can serve as a designated store for data, regardless of which of the networked computing devices a user is currently using. Although this approach attempts to centralize storage, it can become deficient in that users are required to remember the location and name of the centralized shared storage location. Further, in the event that the shared storage location is renamed, moved or otherwise modified, users would be unable to access desired content.

Another approach for a more centralized storage of data files in managed networks corresponds to the maintenance of roaming user profiles that define where data is stored. Although a roaming user profile would assist in locating data files stored in various locations, the storage and update of the roaming profiles provides a greater burden on the processing and memory resources of the computer network. Accordingly, as the number of networked computing devices increases, the burden of a roaming user profile would also increase.

A further approach for a more centralized storage of data files in both managed and unmanaged networks corresponds to the redirection of local file system actions to a designated storage location on the network. For example, a request for the contents of a local storage location may be redirected automatically to retrieve the contents of a designated storage location on the network, which may be remote from the computing device. Similarly, a request to store data locally may be redirected automatically to store the selected content at the designated storage location on the network. Although this approach would allow all data requests to be directed towards a central storage location without requiring the user to know the location of the designated location, it prevents the storage and retrieval of content on the local machines. Further, in the event that the designated storage location is renamed, moved or otherwise modified, users would be unable to access desired content.

Thus, based upon the above-mentioned deficiencies associated with the small-scale networks there is a need for a system and method for managing content stored on two or more machines in a computer network.

SUMMARY OF THE INVENTION

A system and method for generating aggregated content views in a computing network are provided. A host computing device obtains a request for an aggregated view of content corresponding to a set of criteria. The host computing device queries itself and each computing device in a defined network for locally stored content matching the set of criteria. The query results are merged and displayed to a user at the host computing device as an aggregated list view.

In accordance with an aspect of the present invention, a method for managing data available for access on the network is provided. The method may be implemented in a computer network having two or more computing devices in communication. In accordance with the method a host computing device included as part of the computer network and associated with a user obtains a request to identify data corresponding to a set of criteria and obtains an identification of data stored on the host computing device associated with the user request and matching the set of criteria. The host computing device automatically obtains an identification of data stored on at least one computing device included in the computer network and matching the set of criteria. The host computing device merges the identification of data stored on the host computing device associated with the user request and the identification of data stored on at least one computing device included in the computer network. The host computing device then generates a result of the merging the identification of data stored on the host computing device associated with the user request and the identification of data stored on at least one computing device included in the computer network.

In accordance with another aspect of the present invention, a method for managing data available for access on the network is provided. The method may be implemented in a computer network having two or more computing devices in communication. In accordance with the method, a computing device obtains a user request to identify content stored on the two or more computing devices. The computing device automatically queries the two or more computing devices within the computer network to identify the contents of local computing device storage locations associated with a unique user identifier. The computing device merges the results of the queries. Additionally, the computing device displays the results of the merge query results.

In accordance with a further aspect of the present invention, a method for managing data available for access on the network is provided. The method may be implemented in a computer network having a computing device directly associated with a user and at least one remote computing device in communication. In accordance with the method, a computing device directly associated with a user obtains a request to identify data corresponding to a set of criteria. The computing device directly associated with a user obtains an identification of locally stored content matching the set of criteria and transmits a request to the remote computing device for an identification of content matching the set of criteria. The remote computing device obtains an identification of locally stored content matching the set of criteria and transmits the identification of locally stored content matching the set of criteria. The computing device directly associated with the user then merges the content matching the set of criteria and generates a result of the merged content matching the set of criteria.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention corresponds to a system and method for generating aggregated views of content stored in various computing devices in a computer network. More specifically, the present invention corresponds to a system and method for automatically querying computing devices in a defined network and generating a view of the merged query responses. Although the present invention will be described with regard to a computing device network in which all the network computing devices have common security profiles for all authorized users of the network, one skilled in the relevant art will appreciate that the present invention may be implement in alternative computing networks in which each computing device may maintain separate security profiles for authorized network users. Further, one skilled in the relevant art will appreciate that some or all of the aspects of the present invention may be practiced in managed computer networks having a centralized network authority for regulating user access. Accordingly, the embodiments described with regard to the present invention are illustrative in nature and should not be construed as limiting.

Figure 1:
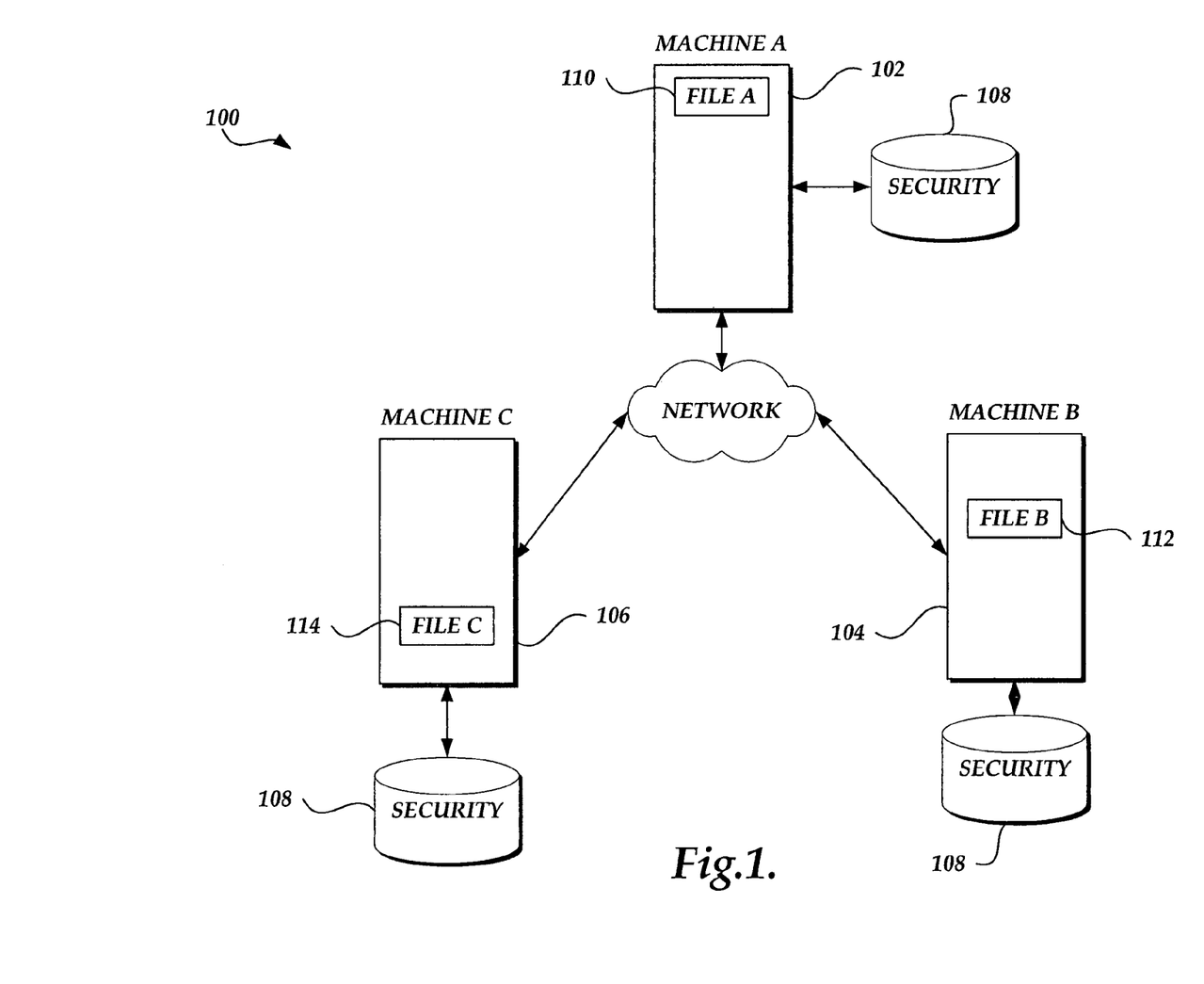
FIG. 1 is a block diagram of an unmanaged computer network including three computing devices locally storing varied content in accordance with the present invention.

FIG. 1 is a block diagram illustrative of a computing device network 100 including three computing devices 102, 104, and 106 in accordance with the present invention. The computing devices 102, 104, 106 may be embodied as any one of a variety of devices that may be utilized to persist content to the computer network 100. Examples of computing devices include, but are not limited to, personal computing devices, hand-held computing devices, server-based computing devices, personal digital assistants, mobile telephones, stand-alone memory devices, electronic devices having some type of memory, and the like.

In an illustrative embodiment of the present invention, each computing device 102, 104 and 106 maintains a database of security information 108 that corresponds to a unique security identifier ("SID") for each authorized user. The database 108 may also maintain information associating unique user SIDs to one or more groups of users, such as administrator, users, reviewers, and a unique security identifier for the group. In accordance with the illustrative embodiment, the security information database 108 is replicated at each of the computing devices 102, 104, 106 such that a user's security profile, including a user SID, is accessible at any one of the computing devices. A more detailed explanation of the replication of security profile information across a computing network can be found in commonly assigned, co-pending application Ser. No. 10/414,354, entitled SMALL-SCALE SECURED COMPUTER NETWORK GROUP WITHOUT CENTRALIZED MANAGEMENT, and filed on Apr. 15, 2003. U.S. patent application Ser. No. 10/414,354 is incorporated by reference herein.

As illustrated in FIG. 1, for a particular user, a first computing device 102, "MACHINE A", maintains a first file 110, "FILE A", on a local storage location, such as a hard drive or other mass storage device, that can be access in some manner by the user. Similarly, a second computing device 104, "MACHINE B" maintains a second file 112, "File B" and a third machine 106, "MACHINE C", maintains a third file 114, "File C", both of which can be accessed in some manner by the user. As will be explained in additional detail below, in an illustrative embodiment of the present invention, each file 110, 112, 114 maintains an access control list ("ACL") that indicates which user SIDs and group SIDs that may have access to the particular file. Additionally, each file ACL may also indicate limitations to the type of access a particular user SID or group SID may have. For example, a file ACL may indicate that a particular user may access a file to read the file, but cannot modify the file in any manner. Further, each file ACL may also indicate a current owner of the file corresponding to the user SID that created the file and/or last edited the file. However, under conventional data management approaches, the user would have to remember the precise location of each piece of data to access the data remotely. Although the management of the data is described with regard to an ACL, one skilled in the relative art will appreciate that additional data management, such as security encryption, digital rights management, and the like, may also be utilized.

Figure 2:
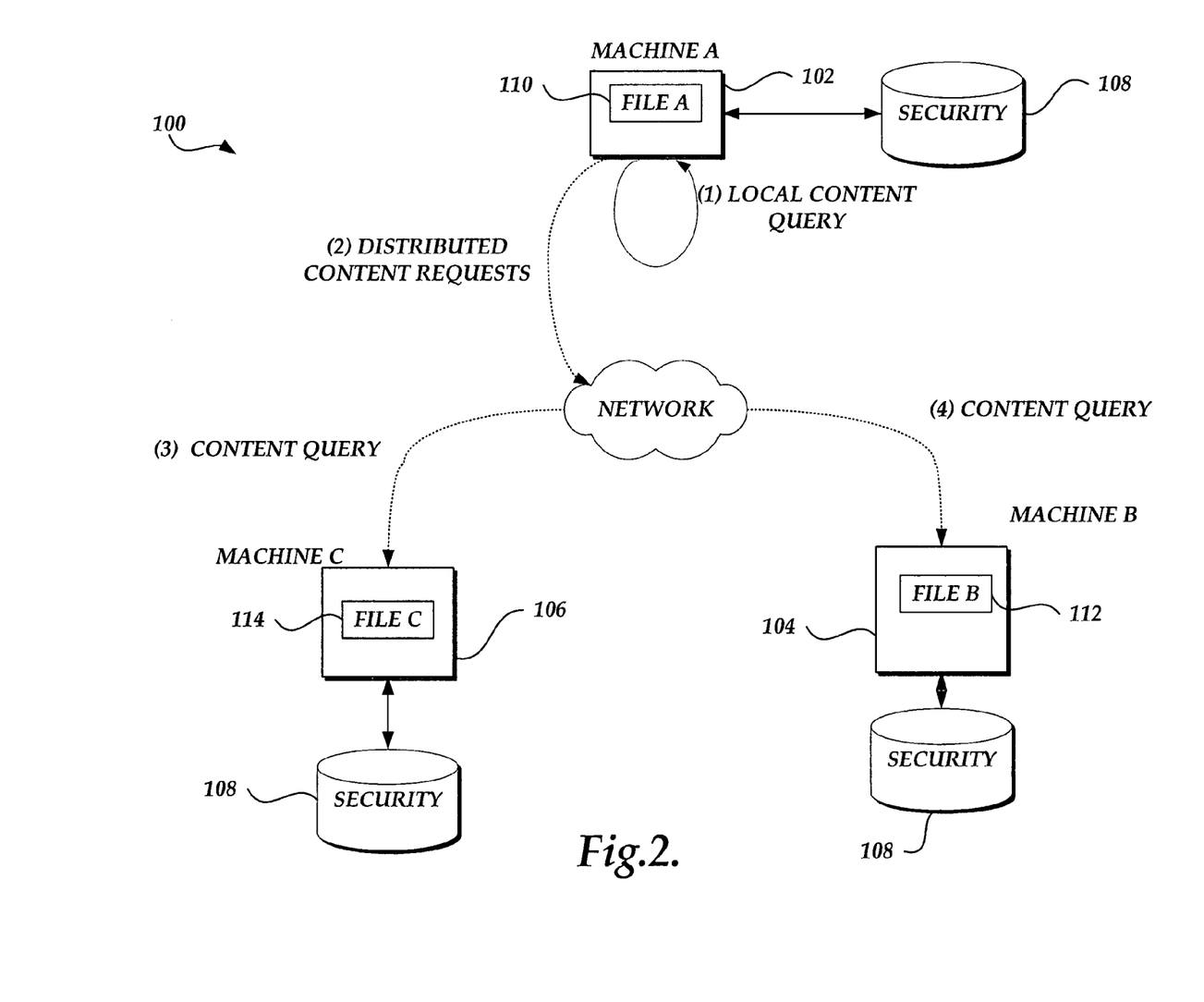
FIG. 2 is a block diagram of the computer network of FIG. 1 illustrating the initiation of a user data request and content query in accordance with the present invention.
Figure 3:
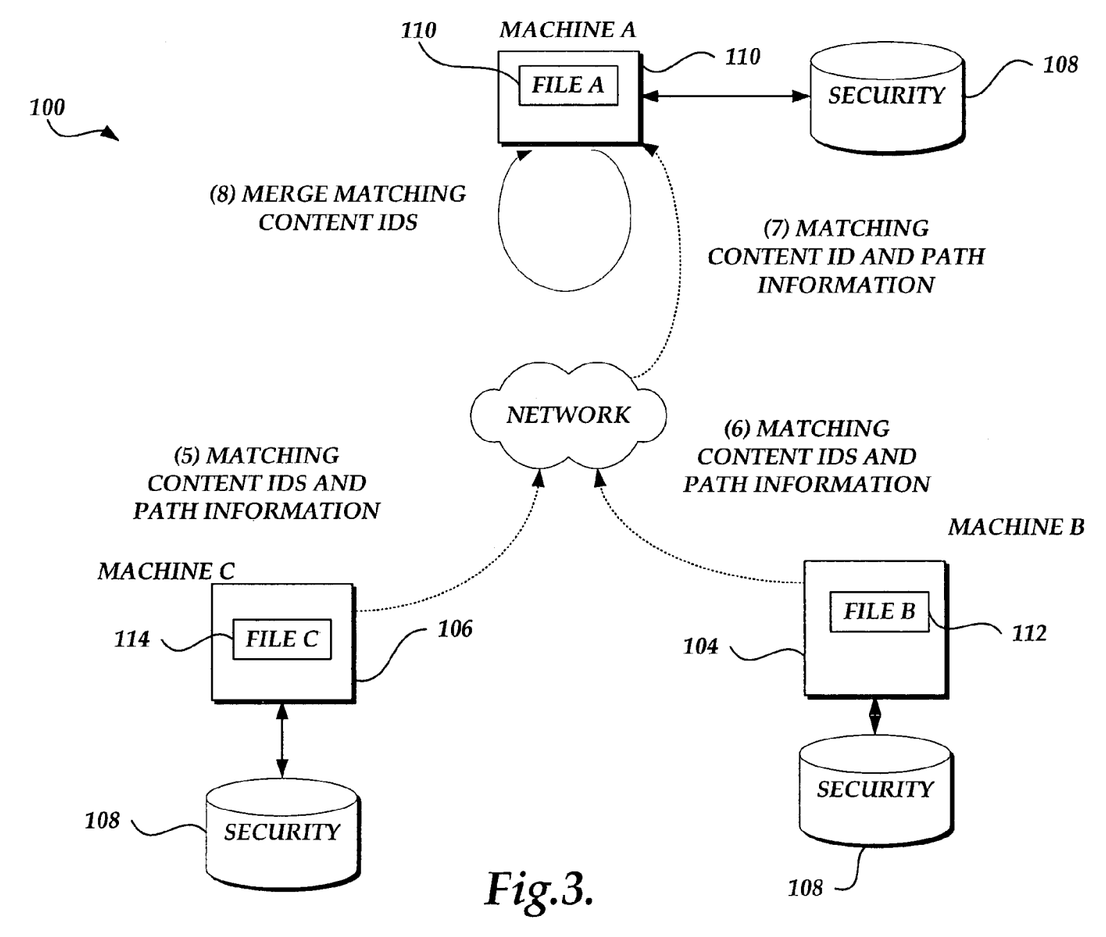
FIG. 3 is a block diagram of the computer network of FIG. 1 illustrating the return and merging of matching content identifiers from the networked computing devices in accordance with the present invention.
Figure 4:
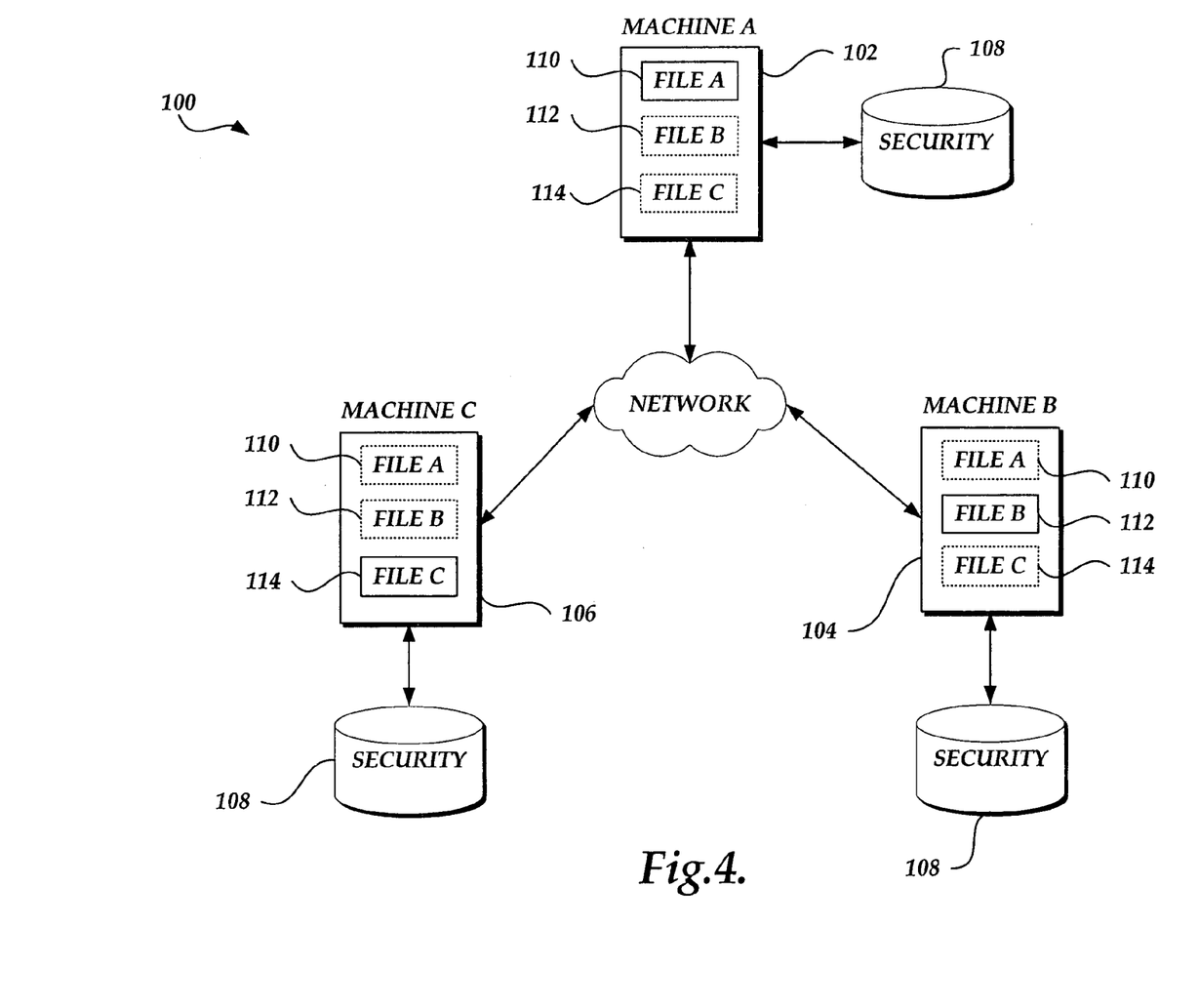
FIG. 4 is a block diagram of the computer network of FIG. 1 illustrating the result of processing aggregated view requests at each computing device in the network in accordance with the present invention.

With reference now to FIGS. 2-4, the initiation and processing of an aggregated view request among the three computing devices 102, 104 and 106 of the computer network 100 will be described. With reference to FIG. 2, the process is initiated with the receiving a content identification request at MACHINE A 102 by the user. Based on a unique SID associated with a particular user, or user account, MACHINE A 102 initiates a local content query corresponding the unique SID and any one of a variety of criteria that may used to select data. Concurrently with the local content query, or after the processing of the local query, MACHINE A 102 automatically initiates a distributed content request to the computing devices 104, 106 in the network 100. Because the security profiles in each computing device in the illustrative network have replicated security profile databases 108, MACHINE A 102 may issue identical content queries to each computing device. Further, although FIG. 2 illustrates that every computing device on the network 100 receives the distributed content query, MACHINE A may also limit the content requests to a subset of computing devices within the network 100.

With reference now to FIG. 3, each computing device receiving the content request processes the request and returns information identifying the matching content and the location of the content. For example, in the illustrative example, MACHINE B 104 would return information identifying File B 112 and its specific location within MACHINE B's storage system. Likewise, MACHINE C 106 would return information identifying File C 114 and its specific location within MACHINE C's storage system. In an illustrative embodiment of the present invention, the content located at each computing device is not transmitted to the requesting computing device. Further, as will be explained in greater detail below, previously stored content request responses or cached content request responses may also be processed.

Once the query responses are received by MACHINE A 102, the query results are merged. In an illustrative embodiment of the present invention, the merged results are embodied as single representation of all the matching content without direct reference to the location, or origin, of the content. However, MACHINE A 102 may obtain additional instructions from the user to sort, or otherwise organize, the merged results for the requesting user. For example, MACHINE A 102 may sort the merged content by size, date, origin, and the like. Still further, MACHINE A 102 may associated additional visual cues to the merged results to identify specific pieces of data, such as data stored on a computing device that is not currently available.

FIG. 4 is a block diagram of the computer network 100 of FIG. 1 illustrating the result of processing aggregated view requests at each of the computing devices in the network. For purposes of FIG. 4, it is assumed that each of the computing devices 102, 104, 106 issued aggregated view requests and that the content of each computing device has not been modified. The aggregated view for MACHINE A 102 shows File A 110, File B 112, and File C 114 with File B and File C illustrated in dotted lines to show that they are stored remotely from MACHINE A. Similarly, the aggregated view for MACHINE B 104 shows the identical content with File A 110 and File C 114 illustrated in dotted lines to show that they are stored remotely. Finally, the aggregated view for MACHINE C 106 shows the identical content with File A 110 and File B 112 illustrated in dotted lines to show that they are stored remotely. Based on the aggregated views at each computing device 102, 104, 106, the user could access the same content without requiring knowledge of its actual location. Further, in the event that one or more of the computing devices are not available, the computing device may still show the content stored on the unavailable machine with additional visual cues to indicate that it is not currently available.

Figure 5:
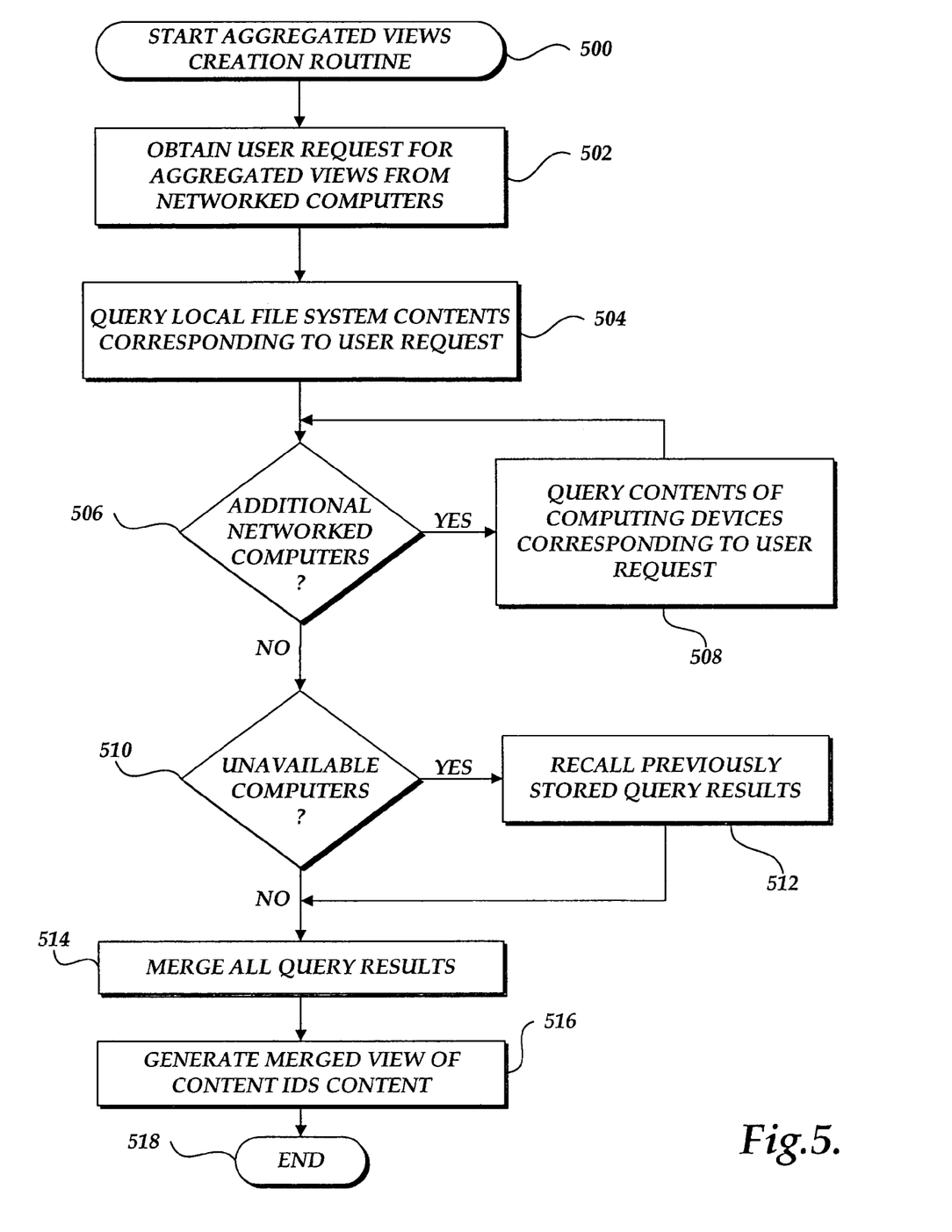
FIG. 5 is a flow diagram illustrative of an aggregated view creation routine implemented by a networked computing device in accordance with the present invention.

FIG. 5 is a flow diagram illustrative of an aggregated view creation routine 500 implemented by a network computing device, such as computing devices 102, 104, 106, in accordance with the present invention. At block 500, a user request for creating an aggregated view of content is obtained. In an illustrative embodiment of the present invention, the aggregated view request can correspond directly to a user's access to any type of application, or module, displaying content. For example, an aggregated view request may correspond to a request to open a file within a software application program. Similarly, an aggregated view creation request may correspond to the initiation of a file system management program. Still further, the aggregated view request may be automatically generated at the occurrence of specific events, such as at a particular time of day, after a computing device has powered up, after a computing device has connected to the network, and the like.

At block 502, the computing device queries the local computing device file system for content matching a content query. In an illustrative embodiment of the present invention, the content query is in the form of a database query, such as a query function support by Microsoft Corporation's SQL database. The database query includes a set of criteria for determining matching content. In an illustrative embodiment of the present invention, the query includes a request to match all content in which the user, identified by a user SID security token, can access. Additionally, the query can include any number of additional criteria, such as keyword searches, file types, date ranges, etc., that can be used to match content. The computing device storage system can then accept the query and identify any content that matches the query criteria. One skilled in the relevant art will appreciate that some or all portions of the query string, such as the user SID, may be entered automatically without requiring additional user input. Alternatively, some portion of the query string, such as the additional search criteria, may be specified by user at the time the search is requested or a pre-determined as part of a configuration of the computing device.

At decision block 506, a test is conducted to determine whether there are additional computing devices connected to the network 100. In an illustrative embodiment of the present invention, the test for the additional computing devices may correspond to a polling of every computing device connected to the network. Alternatively, the test for additional computing devices may be limited to a specific subset of computing devices defined by a system administrator or the user. If there are additional computing devices within the network, at block 508, the computing device associated with the user sends content queries to the additional computing device. In an illustrative embodiment of the present invention, because the user's security profile, e.g., SID, is replicated to each computing device, the content query can be identical. Alternatively, if a user's security profile may change, each content query may be unique to accommodate for various user security identifiers. Blocks 506 and 508 will repeat until all the computing devices within the network 100, or subset of computing devices, has been queried. In accordance with an illustrative embodiment of the present invention, the results of the query are transmitted to the requesting computing device in the form of a content identifier and a path for locating the content, such as a Uniform Name Location ("UNC") path. As described above, the content does not need to be moved to the requesting computing device. Additionally, the requesting computing device does not need to make a copy of the content. Further, in an illustrative embodiment of the present invention, the computing device can maintain a copy of a previously received content request reply from the remote computer in a memory, such as RAM or cache. In addition to issuing a new content request from the remote computing device, the computing device may recall the previously received content request for the same remote computing device and begin processing the previously received content request. One the new content request is received, the computing device can update the response and store the new results for subsequent use.

Once all the networked computing devices have been queried, at decision block 510, a test is conducted to determine whether there are any previously networked computing devices that are not currently available. One skilled in the art will appreciate that any number of computing devices may be temporarily unavailable such as being powered down, out of wireless communication range or not currently docked to a network connection. If there are any previously networked computing devices that are not currently available, at block 512, the computing device attempts to recall a previously stored content request result for the unavailable computing device.

Once all of the computing devices have been queried, at block 514, the requesting computing device merges the result of the content queries as an aggregated list. In an illustrative embodiment of the present invention, the computing device may filter, or otherwise process, the merged results. Additionally, the computing device may archive, cache or otherwise store, the merged results for use in subsequent aggregated list creation. At block 516, the merged content identifier view is generated and displayed to the user for manipulation. In an illustrative embodiment of the present invention, the results of the merging are represented to the users a flat view including content from all of the computing devices. Further, in the illustrative embodiment, the origin of the content is not initially displayed to the user. However, one skilled in the relevant art will appreciate that the requesting computing device can perform additional filtering or organization to display the matching content to the user. For example, the requesting computing device may sort the matching content by various attributes, such as data size, data type, title, date criteria, and the like. Further, the location of the origin of the content may be provided directly to the user, either as part of the initial view or as part of additional data available on the request of the user. Still further, in the event that one of the computing devices is unavailable, the merged view may be represented to the user with special visual cues, such as transparent icons, to indicate to the user the content that is likely stored on the unavailable computing device, but that can't current be accessed. In another embodiment, the computing device may utilize a previously stored record of the to compare to a current aggregated view. The computing device can then indicate which files have been modified, removed, or added. At block 518, routine 500 terminates.

Figure 6A:
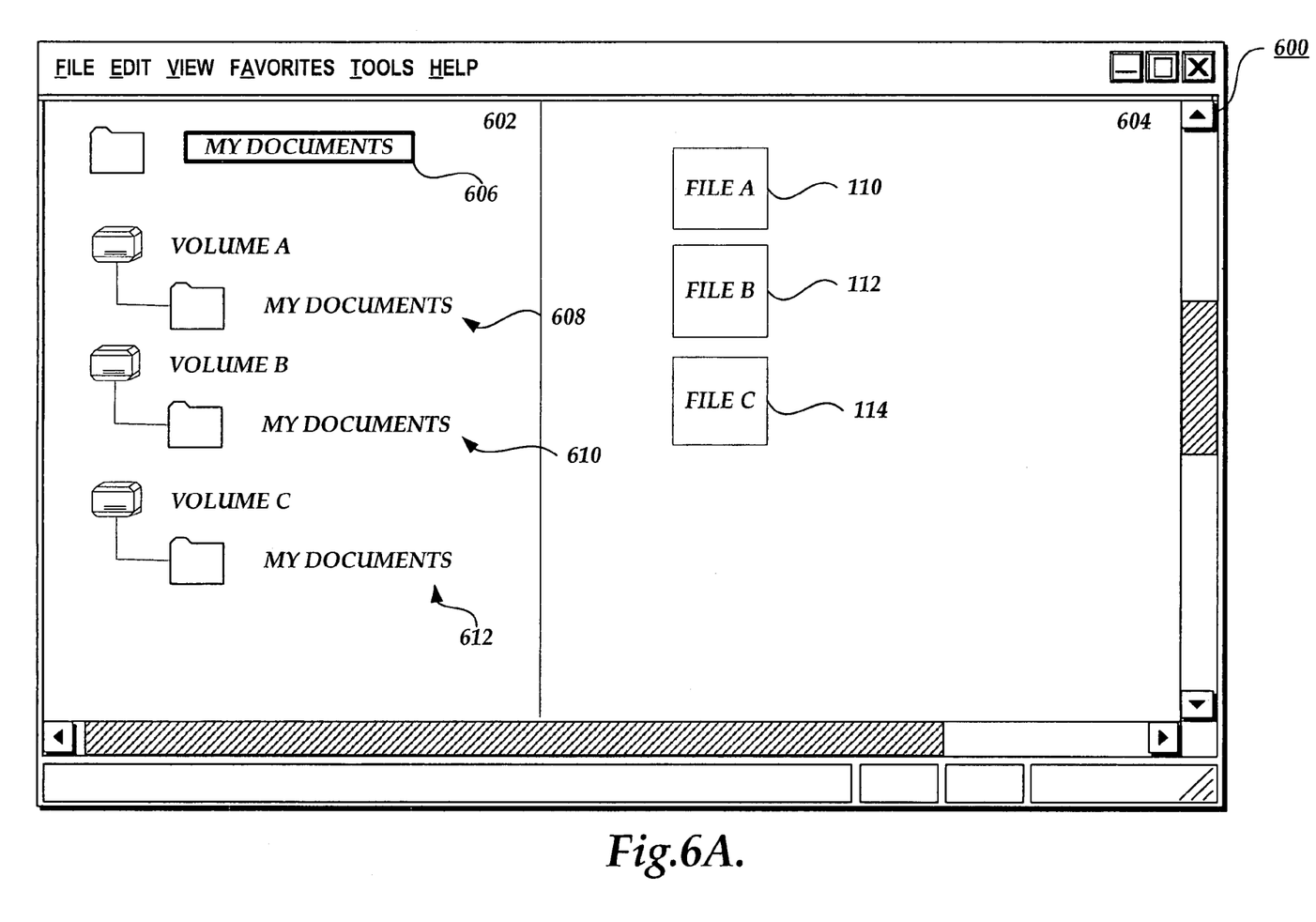
FIGS. 6A-6D are block diagrams illustrative of screen displays for displaying merged content identifiers corresponding to an aggregated view in accordance with the present invention.

FIGS. 6A-6D are block diagrams illustrative of various screen displays for displaying merged content identifiers in an aggregated list view in accordance with an aspect of the present invention. With reference to FIG. 6A, the screen display 600 can include a first display portion 602 for allowing a user to select various file locations of interest. The screen display 600 can also include a second display portion 604 for displaying the specific content stored in a selected file space. With reference to the previous example of FIGS. 1-4, if a user were to initiate an aggregated view request by manipulating the graphical icon 606 corresponding to "My Documents", or otherwise initiating a request to view all files corresponding to the current user, the computing device would execute routine 500. The resulting three files 110, 112, 114 would be then displayed to the user in the second display portion 604 without need for the user to know the origin of the content. In contrast, under traditional file system management, the user would need to access each computing device file system independently to identify the location of each particular file of interest. For example, if files 110, 112 and 114 corresponded to icons 608, 610 and 612 respectively, the user would need to access each icon separately to view the same files created by the aggregated view.

Figure 6B:
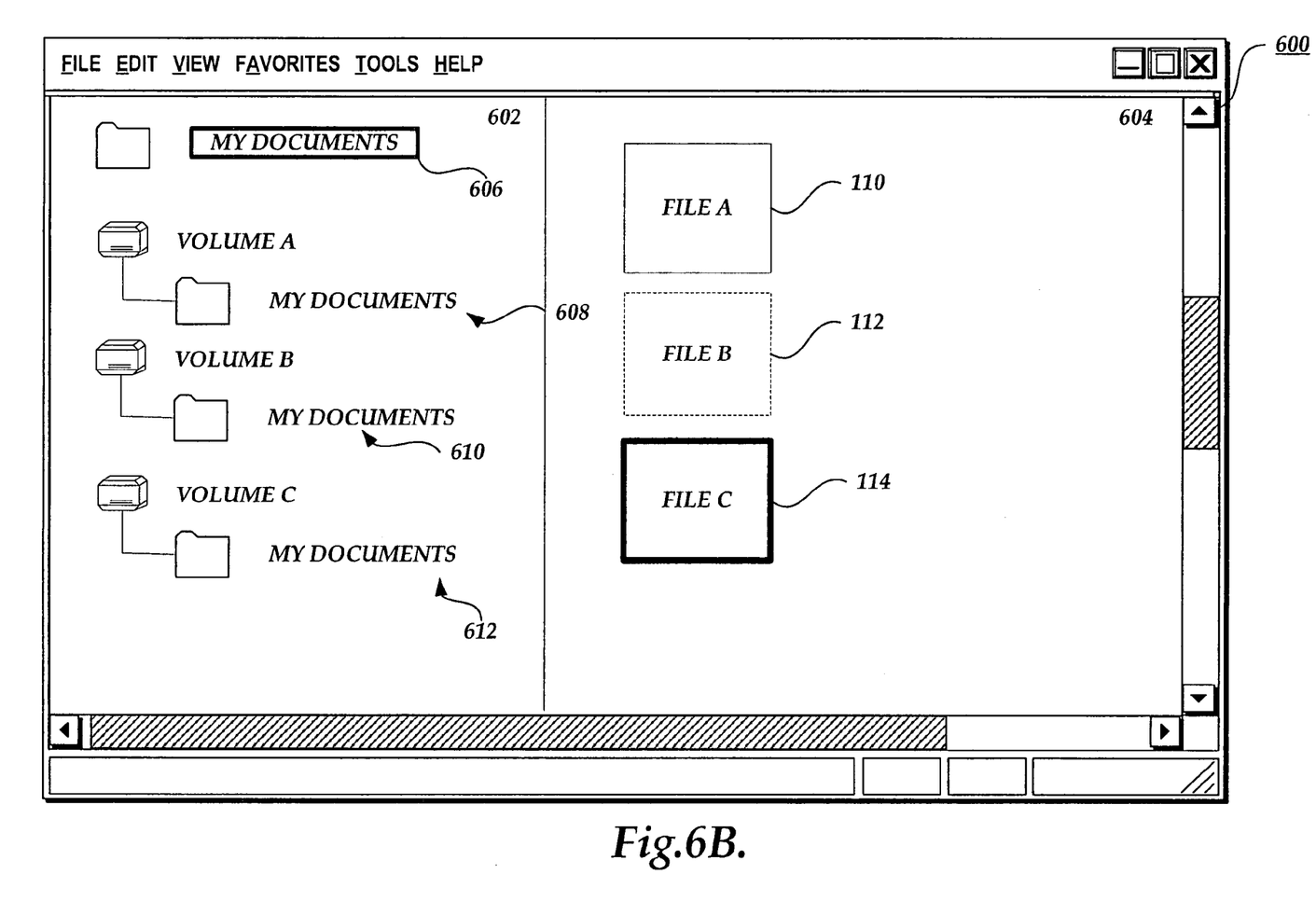

With reference now to FIG. 6B, one or more of the content identifiers in the second portion of the screen display 600 may include visual cues to assist the user. For example, if a computing device is not currently connected to the network and the requesting computing device has utilized a previously cached or archived content request, the content may distinguished visually as illustrated for file 112. In an illustrative embodiment of the present invention, unavailable content may be displayed with a dotted border and/or in a semi-transparent manner. In another example, content which has been determined by the computing device to have been modified since a previous aggregated view request may be highlighted to the user as illustrated for file 114. In an illustrative embodiment of the present invention, the modified piece of data may be highlighted on the screen display 600.

Figure 6C:
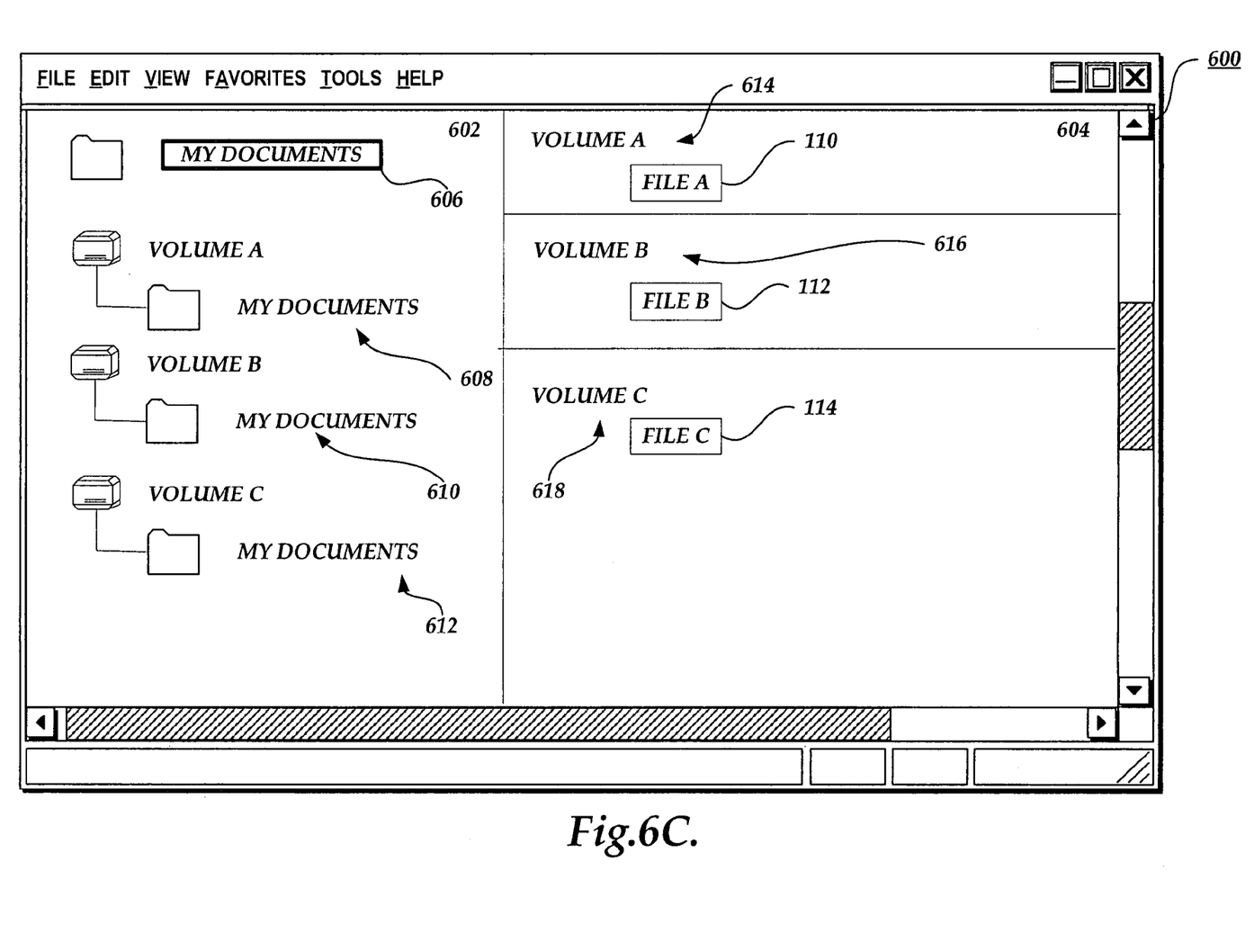
Figure 6D:
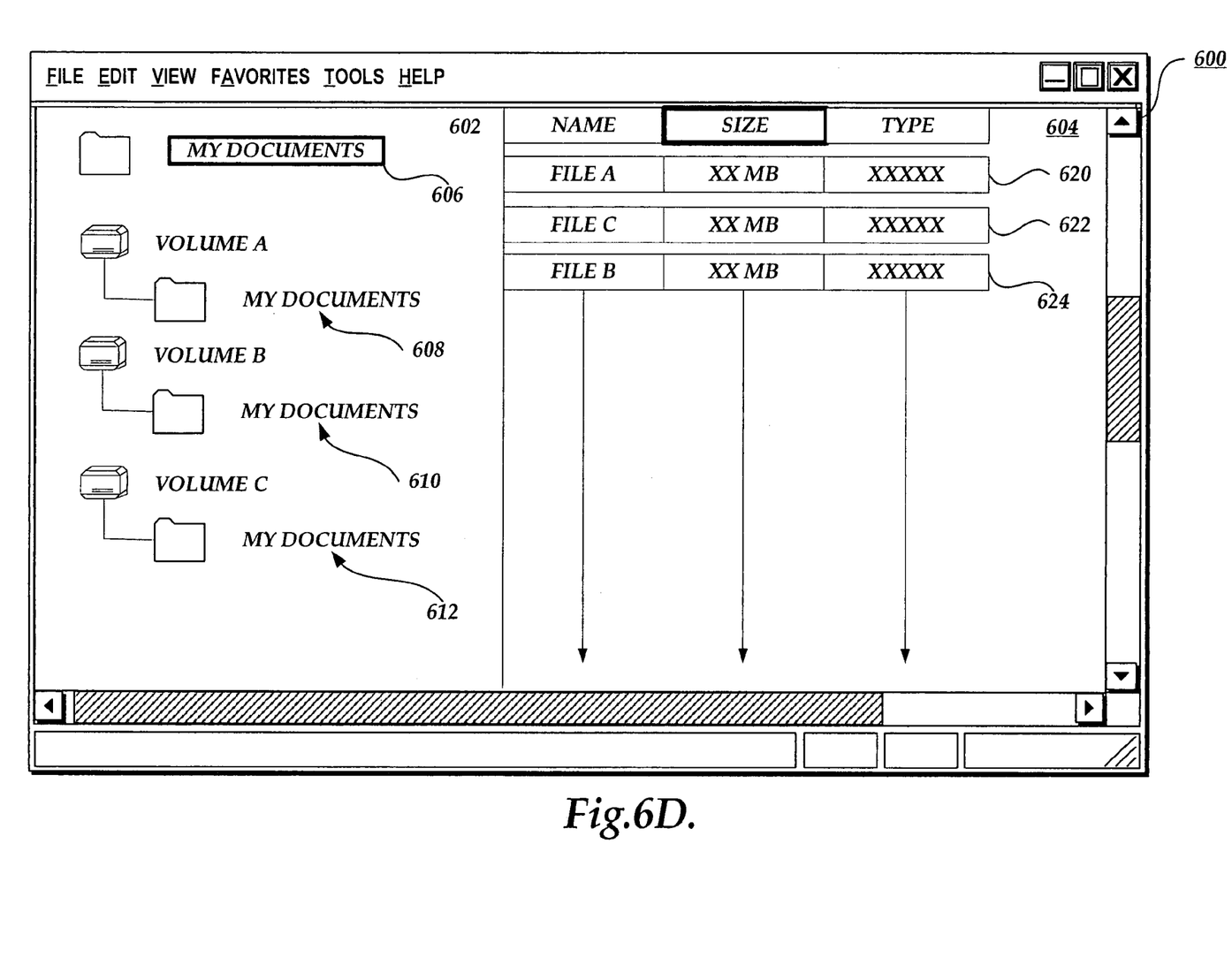

With reference now to FIGS. 6C and 6D, the computing device can automatically sort the merged matching content requests. Additionally, the computing device can obtain user input to sort the merged matching content requests. In one embodiment of the present invention, the merged matching content can be grouped according to the location of the content. With reference to FIG. 6C, the screen display 600 can include additional identifiers 614, 616, 618 that indicate that the identity of the location. Additional levels of storage locations may be also be displayed on the screen display 600. In another embodiment of the present invention, the merged matching content can be grouped according to various attributes of the data. With reference to FIG. 6D, the screen display can include a list view that displays the title of the data, the size of the data in storage and the type of data file. If the data were sorted by size as illustrated in FIG. 6D, File A 620 would be at the top of the list, followed by File C 622, and File B 624. In this embodiment, a user could change the sorting criteria by manipulating the screen display 600. Although FIGS. 6C and 6D illustrate various sorting examples, one skilled in the relevant art will appreciate that additional sorting criteria and/or screen displays would also be included within the scope of the present invention.

Figure 7:
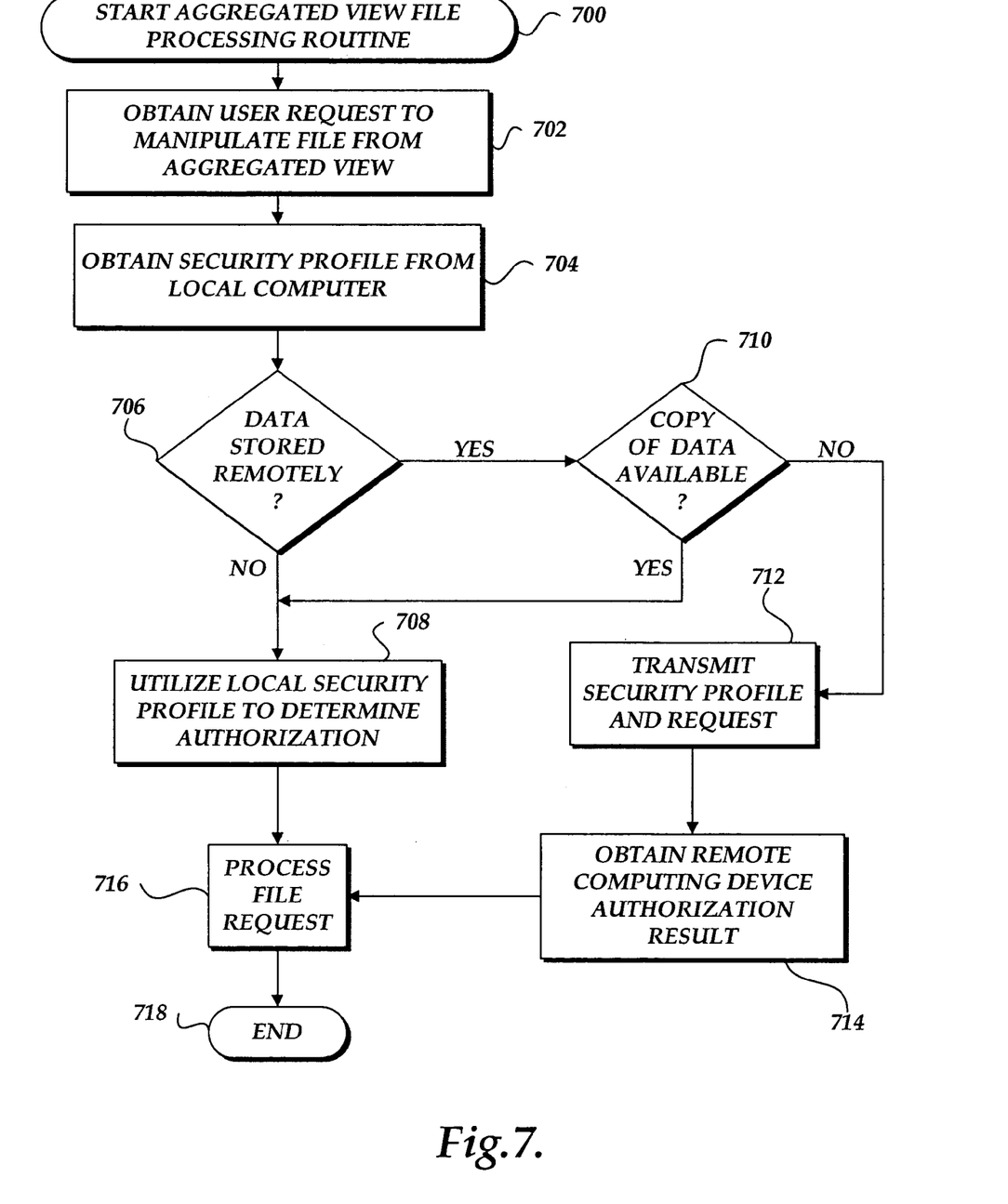
FIG. 7 is a flow diagram illustrative of an aggregated view remote document processing routine implemented by a networked computing device in accordance with the present invention.

With reference now to FIG. 7, a routine 700 for manipulating content in an aggregated view will be described. At block 702, a request to manipulate content displayed in an aggregated view is obtained. One skilled in the relevant art will appreciate that the manipulation of content can include opening a data file with a host software application, modifying content, deleting content, copying content and or moving the content. At block 704, the requesting computing device obtains a security identifier from the local security information database 108.

At decision block 706, a test is conducted to determine whether the selected content is stored locally. If the content is stored locally, at block 708, the computing device processes the request with the local security information to determine whether the user is authorized to manipulate the selected content. If the content is not stored locally, at decision block 710, a test is conducted to determine whether a copy of the requested data is maintained locally by the computing device. In an illustrative embodiment of the present invention, the computing device may maintain copies of previously accessed documents in a volatile memory, such as a computing device cache. If a copy of the file is available locally, the routine 700 proceeds to block 708 to process the request with local security information, as described above. If a copy of the requested file is not maintained locally, at block 712, the requesting computing device transmits the particular user's security information as a token along with a request to manipulate the content to the computing device actually storing the content. The receiving computing device then utilizes the security token to process the request and transmits a response. At block 714, the sending computing device receives the response from the receiving computing device. If the manipulation is authorized at block 708 or at block 712, the user is allowed to manipulate the content at block 716. The routine 700 terminates at block 718.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a computer network having three or more computing devices in communication, a method for managing data available for access on the network, the method comprising:
    obtaining, at a host computing device included as pan of the computer network and associated with a user, a first user request to identify data corresponding to a set of criteria, the set of criteria including a unique security ID associated with the user;
    verifying authorization of the user to access the data corresponding to the set of criteria based on the unique security ID;
    obtaining an identification of data stored on the host computing device associated with the first user request and matching the set of criteria;
    automatically obtaining an identification of data stored on at least one computing device included in the computer network and matching the set of criteria;
    merging the identification of data stored on the host computing device associated with the user request and the identification of data stored on the at least one computing device included in the computer network;
    generating a first user result from the merging of the identification of data stored on the host computing device associated with the first user request and the identification of data stored on the at least one computing device included in the computer network;
    maintaining a record of the first user result;
    obtaining, at the host computing device, a second user request to identify data corresponding to the set of criteria;
    obtaining a second user result identifying data associated with the second user request and matching the set of criteria, stored on the host computing device;
    querying any other computing device in the computer network available to identify data associated with the second user request in response to the second user request;
    determining that one computing device in the computer network that was previously searched as a result of the first user request is unavailable to identify data corresponding to the second user request;
    generating a recalled result portion by recalling a portion of the first user result containing data located on the one computing device that is unavailable during the second user request;
    generating a substituted result by substituting the recalled result portion for results from the second user request of the one unavailable computing device; and
    generating a merged result by mer in results including a result from the any other computing device available to identify data in response to the second user request, the second user result, and the substituted result.

2. The method as recited in claim 1, wherein generating a merged result by merging results including a result from the any other computing device available to identify data in response to the second user request, the second user result, and the substituted result includes generating visual cues corresponding to data not currently available to the user.

3. In a computer network having three or more computing devices in communication, a method for managing data available for access on the network, the method comprising:
    obtaining a first user request to identify data stored on the three or more computing devices, wherein one of the three or more computing devices is a local computing device, the data corresponding to a set of criteria, the set of criteria including a unique user security ID;
    automatically querying the three or more computing devices within the computer network to identify data stored on local computing device storage locations associated with the unique user security ID on the three or more computing devices;
    verifying authorization of the user, based on the unique user security ID, to access the data corresponding to the set of criteria;
    merging results of the querying;
    generating a first user result from merging results of the querying;
    displaying the first user result;
    maintaining a record of the first user result;
    obtaining a second user request to identify data stored on the three or more computing devices;
    transmitting the second user request to one or more available computing devices on the computer network;
    obtaining a second user result identifying data stored on the one or more available computing devices in the computer network associated with the unique user security ID and matching the unique user ID in response to the second user request sent to the one or more available computing devices;
    determining that one of the three or more computing devices previously searched as a result of the first user request is unavailable to identify data corresponding to the second user request;
    generating a recalled result portion by recalling a portion of the first user result containing data located on the one computing device that is unavailable during the second user request;
    generating a substituted result by substituting the recalled result portion for results from the second user request of the one unavailable computing device; and
    generating a merged result by merging the second user result and the substituted result.

4. The method as recited in claim 3, wherein generating the merged result includes generating visual cues corresponding to data not currently available to the user.

5. In a computer network having a computing device directly associated with a user and at least two remote computing devices in communication, a method for managing data available for access on the network, the method comprising:
    obtaining, by the computing device directly associated with the user, a first request to identify data corresponding to a set of criteria, the set of criteria including a unique security ID associated with the user;

verifying authorization, based on the unique security ID of the user, to access the data corresponding to the set of criteria;

obtaining, by the computing device directly associated with the user, an identification of locally stored data matching the set of criteria;

transmitting, by the computing device directly associated with the user, the first request to the at least two remote computing devices for an identification of data matching the set of criteria;

obtaining, by the at least two remote computing devices, identification of locally stored data matching the set of criteria;

transmitting, by the at least two remote computing devices, the identification of locally stored data matching the set of criteria;

generating a first user result by merging, by the computing device directly associated with the user, data matching the set of criteria stored on the device directly associated with the user and the at least two remote computing devices;

maintaining a record of the first user result;

obtaining, by the computing device directly associated with the user, a second user request to identify data corresponding to the set of criteria;

transmitting, by the computing device directly associated with the user, the second user request to any available remote computing devices on the computer network to identify data corresponding to the set of criteria;

obtaining, by the computing device directly associated with the user, a second user result comprising an identification of data stored locally matching the set of criteria and data stored on the any available remote computing device that is still available to identify data in response to a request;

determining, by the computing device directly associated with the user, that one remote computing device that was previously searched as a result of the first user request is unavailable to identify data corresponding to the second user request;

generating a recalled result portion by recalling, by the computing device directly associated with the user, the portion of the first user result containing data located on the one remote computing device that is unavailable during the second user request;

generating a merged result by merging, by the computing device directly associated with the user, the second user result and the substituted result.

6. The method as recited in claim 5, wherein generating a merged result by merging the second user result and the substituted result includes generating visual cues corresponding to data not currently available to the user.

* * * * *

UNITED STATES PATENT AND TRADEMARK OFFICE
CERTIFICATE OF CORRECTION

PATENT NO. : 7,620,679 B2 Page 1 of 1
APPLICATION NO. : 10/691872
DATED : November 17, 2009
INVENTOR(S) : Reasor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,620,679 B2  
APPLICATION NO. : 10/691872  
DATED : November 17, 2009  
INVENTOR(S) : Sterling Reasor et al.

It is certified that error appears in the above-identified patent and that said Letters Patent is hereby corrected as shown below:

In column 9, line 24, in Claim 1, delete "pan" and insert -- part --, therefor.

In column 10, line 1, in Claim 1, delete "mer in" and insert -- merging --, therefor.

In column 11, line 27, in Claim 5, delete "toany" and insert -- to any --, therefor.

Signed and Sealed this  
Twenty-second Day of February, 2011

David J. Kappos  
*Director of the United States Patent and Trademark Office*